United States Patent [19]
Rauch et al.

[11] Patent Number: 5,889,545
[45] Date of Patent: Mar. 30, 1999

[54] METHOD AND APPARATUS FOR IMAGE REGISTRATION IN A SINGLE PASS ROS PRINTER USING A ROTATABLE OUTPUT WINDOW WITH NO OPTICAL POWER

[75] Inventors: Russell B. Rauch, Pasadena; Anthony Ang, Long Beach; Edward Mycek, La Quinta, all of Calif.

[73] Assignee: Xerox Corporation, Stamford, Conn.

[21] Appl. No.: 673,884

[22] Filed: Jul. 1, 1996

[51] Int. Cl.[6] .............................. B41J 2/385; G03G 15/01
[52] U.S. Cl. ............................................ 347/134; 347/118
[58] Field of Search .................................... 347/134, 153, 347/248, 241, 256, 257, 233, 129; 359/204, 216; 358/481

[56] References Cited

U.S. PATENT DOCUMENTS

| | | | |
|---|---|---|---|
| 4,660,059 | 4/1987 | O'Brien | 347/115 |
| 5,208,796 | 5/1993 | Wong et al. | 369/97 |
| 5,302,973 | 4/1994 | Costanza et al. | 347/233 |

*Primary Examiner*—N. Le
*Assistant Examiner*—L. Anderson
*Attorney, Agent, or Firm*—William Propp

[57] ABSTRACT

A single pass ROS system provides a plurality of latent images which may subsequently be developed in different colors. The ROS units are initially aligned so that each color image is precisely registered at the same relative position along the exposed area of a photoreceptor belt. The alignment is accomplished by forming a pair of opposed alignment apertures in the surface of the belt and detecting coincidence or lack of coincidence of signals generated by the beginning and end of each scan line. The correction is enabled by rotating the output window in the ROS system, a transmissive optical component with no optical power, subsequent to the ROS, to create the required rotation of the projected scan line. Once the initial X and Y-axis alignments are complete, subsequent alignment is maintained through subsequent passes by checking the positions of the previously identified pixels as they advance past additional lead edge apertures formed in the process direction along the belt surface.

10 Claims, 5 Drawing Sheets

5,889,545

METHOD AND APPARATUS FOR IMAGE REGISTRATION IN A SINGLE PASS ROS PRINTER USING A ROTATABLE OUTPUT WINDOW WITH NO OPTICAL POWER

BACKGROUND OF THE INVENTION

The present invention relates to registration of plural image exposures formed on a photoreceptor by a plurality of Raster Output Scanning (ROS) systems and, more particularly, to a method and apparatus for registering the image exposures in the process direction of the photoreceptor to form registered color images in a single pass.

This invention relates generally to a raster output scanning system for producing a high intensity imaging beam which scans across a rotating polygon to a movable photoconductive member to record electrostatic latent images thereon, and, more particularly, to an apparatus for providing registration of the beam in the process direction movement of the photoconductive member.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. This laser beam is modulated in conformance with the image information. The modulated beam is transmitted through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e. line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or a multiple pass system.

In a single pass, process color system, three ROS stations are positioned adjacent to a photoreceptor surface and selectively energized to create successive image exposures, one for each of the three basic colors. A fourth ROS station may be added if black images are to be created as well. In a multiple pass system, each image area on the photoreceptor surface must make at least three passes relative to the transverse scan line formed by the modulated laser beam generated by a ROS system. With either system, each image must be registered to within a 0.1 mm circle or within a tolerance of ±0.05 mm. Each color image must be registered in both the photoreceptor process direction (slow scan or skew registration) and in direction perpendicular to the process registration (referred to as fast scan or transverse registration).

The present invention is directed towards a method and apparatus for registering the color images in the process direction only by controlling registration errors at the lead edge of the images.

FIG. 1 shows a prior art, single pass, ROS color printing system 8 having four ROS systems, 10, 12, 14, and 16. The system 8 includes a photoreceptor belt 18, driven in the process direction, indicated by the arrow 19. The length of the belt 18 is designed to accept an integral number of spaced image areas $I_1-I_n$ represented by dashed line rectangles in FIG. 1. Upstream of each image area is a charging station (not shown) which places a predetermined electrical charge on the surface of belt 18. As each of the image areas $I_1-I_n$ reaches a transverse line of scan, represented by lines 20a–20d, the area is progressively exposed on closely spaced transverse raster lines 22, shown with exaggerated longitudinal spacing on the image area $I_4$ in FIG. 1. Each image area $I_1-I_n$ is exposed successively by ROS systems 10, 12, 14, 16. Downstream from each exposure station, a development station (not shown) develops the latent image formed in the preceding image area. A fully developed color image is then transferred to an output sheet. Details of charge and development xerographic stations in a multiple exposure single pass system are disclosed, for example, in U.S. Pat. No. 4,660,059, commonly assigned as the present application and hereby incorporated by reference. The charge, development, and transfer stations are conventional in the art.

Each ROS system contains its own conventional scanning components, of which only two, the laser light source and the rotating polygon, are shown. The particular system 10 has a gas, or preferably, laser diode 10a, whose output is modulated by signals from control circuit 30 and optically processed to impinge on the facets of rotating polygon 10b. Each facet reflects the modulated incident laser beam as a scan line, which is focused at the photoreceptor surface. Control circuit 30 contains the circuit and logic modules which respond to input video data signals and other control and timing signals to operate the photoreceptor drive synchronously with the image exposure and to control the rotation of the polygon 10b by a motor (not shown). The other ROS systems 12, 14, 16, have their own associated laser diodes 12a, 14a, 16a, and polygons 12b, 14b, 16b, respectively. In the system of FIG. 1, transverse alignment of each successive image exposure is obtained, for example, by providing horseshoe shaped sensors 36a, 36b, 36c, 36d, which cooperate with optical targets T1, T2, T3, T4, respectively, formed in the belt surface. Other sensor systems could be used. Further details regarding transverse alignment registration are described in U.S. Pat. No. 5,208,796, commonly assigned as the present application and hereby incorporated by reference. However, for this prior art system, a process alignment must also be accomplished to ensure complete registration of the multiple image exposures.

Printing systems utilizing a ROS to form images on a photoreceptor surface are well known in the art. Conventionally, as seen in prior art FIG. 1, the ROS includes a diode or gas laser for generating a coherent beam of radiation; a modulator for modulating the laser output in accordance with an input video signal; and a multifaceted polygon scanner for scanning the modulated laser beam output line by line, across the surface of the photoreceptor to form the latent image. Also included in the ROS are various optical components to collimate, expand, focus and align the modulated scanning beams. These optical components are fixedly mounted within a housing frame, which is positioned within a printer machine frame, so that the modulated and shaped scanning beams emerging from an output window in the housing are directed in a scan line which is perpendicular to the photoreceptor surface. The lines will be formed in parallel across the surface of the photoreceptor belt.

Referring to FIG. 1, if the images $I_2$, $I_3$, $I_4$ are to be perfectly registered with image $I_1$, the leading edges should be parallel to each other. Each ROS system must be individually aligned to correct for the initial misregistration.

One solution to error while providing slow scan registration is to rotate an optical component of the ROS, as taught in U.S. Pat. No. 5,208,796, commonly assigned as the present application and hereby incorporated by reference.

One of the later optical components, such as one of the fΘ lens or the wobble correction mirror of the ROS is rotated to create the required rotation of the projected scan line. However, the lenses and mirrors of the ROS have optical power in at least one direction, usually both directions. Some optical elements, such as toroids, have optical power that vary with position of the beam on the surface of the element. Furthermore, a ROS is a precision optical system. With the obvious exception of the rotating polygon mirror, the optical components of the ROS should ideally be stationary and fixed. And these optical components are in the focal plane of the ROS.

SUMMARY OF THE INVENTION

According to the present invention, a method and apparatus is provided for aligning ROS units in a single pass printing system, so that each ROS is aligned along the process or X-axis. After this alignment, the images formed by each ROS will be in proper registration within the prescribed tolerances. The alignment in the X-direction is made by sensing exposure lines formed by each ROS through apertures which extend transversely and are at opposite ends of the photoreceptor belt.

The ends of each scan line of each ROS are sensed simultaneously, and, if the detected signals are not coincident in time, an error signal is generated and applied to a precision, linear actuator, such as a stepper motor, which, in turn, transfers the linear motion to the output window of the ROS system. In a preferred embodiment, the output window, a transmissive optical component with no optical power, subsequent to the ROS, is selected to be movable by the actuator, so as to change the offset of the projected scan line in the process direction. This registration is accomplished for the first ROS system and then is repeated for each of the ROS systems until all four leading edge exposures, 20a, 20b, 20c, 20d, are sensed through the two apertures in coincidence, ensuring process registration of the associated color images. More particularly, the present invention relates to an imaging system for forming multiple image exposure frames on a photoconductive member during a single pass including:

a photoreceptor belt adapted to accommodate the formation of an integral number of image exposure frames, said belt having a first and second alignment aperture on opposite sides of the belt width and outside of the exposure frame, a plurality of Raster Output Scanners (ROS) units, each ROS unit associated with the formation of one of said image exposure frames, each ROS unit forming a plurality of projected scan lines in a fast scan (traverse) direction across the belt width, said scan lines beginning and ending at points outside of the image exposure frame, first and second detecting means associated with each of said ROS units, said detecting means adapted to sense the projected scan lines when they become visible through said alignment apertures and to generate position signals indicative thereof, and means for rotating a transmissive optical component with no optical power, subsequent to each ROS unit for rotating said scan line to correct for process registration errors until the detected position signals from said first and second detecting means are concurrent.

DESCRIPTION OF THE INVENTION

Figure 1:
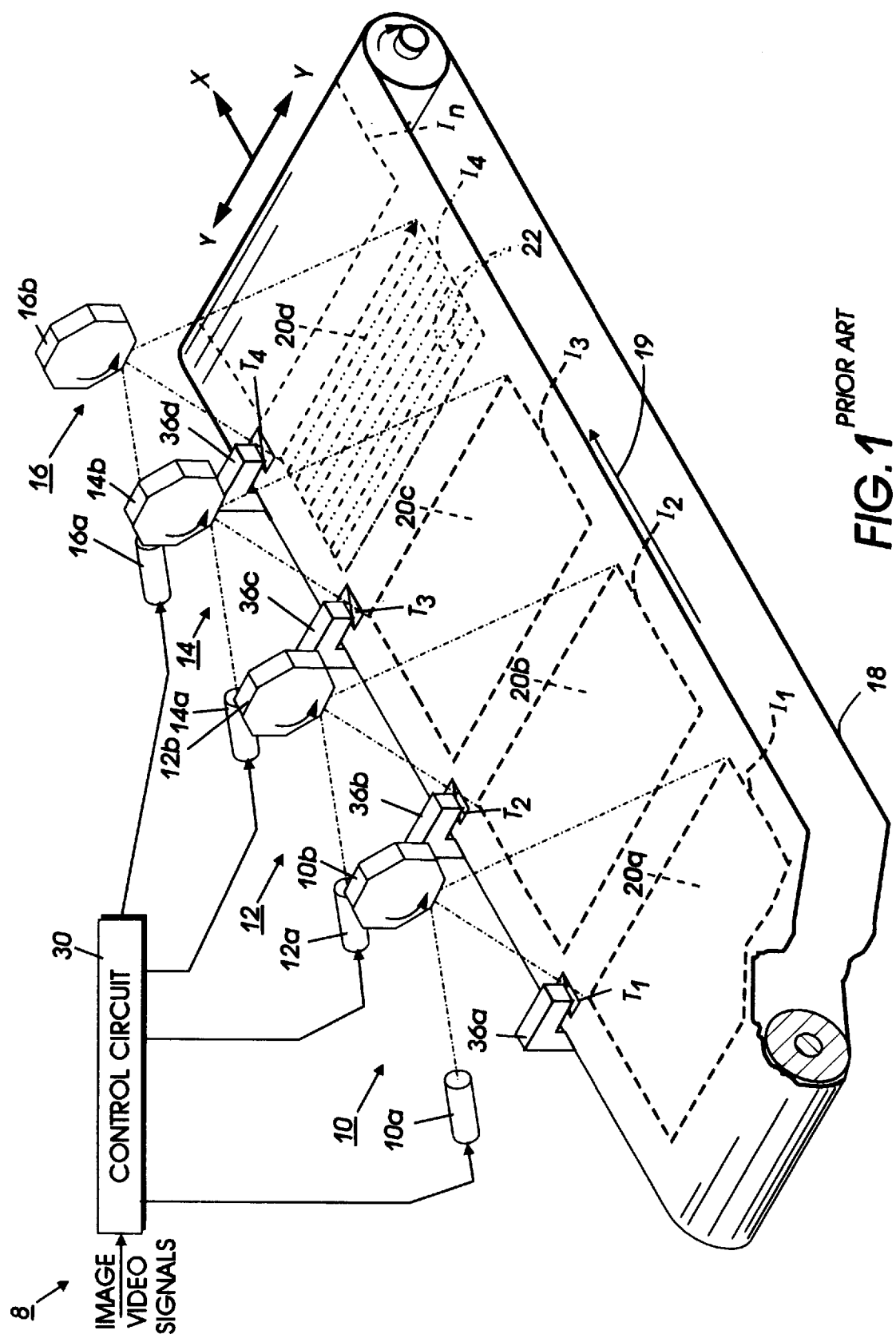
FIG. 1 is a schematic perspective view of a prior art, single pass, multiple ROS system for forming color registered images.
Figure 2:
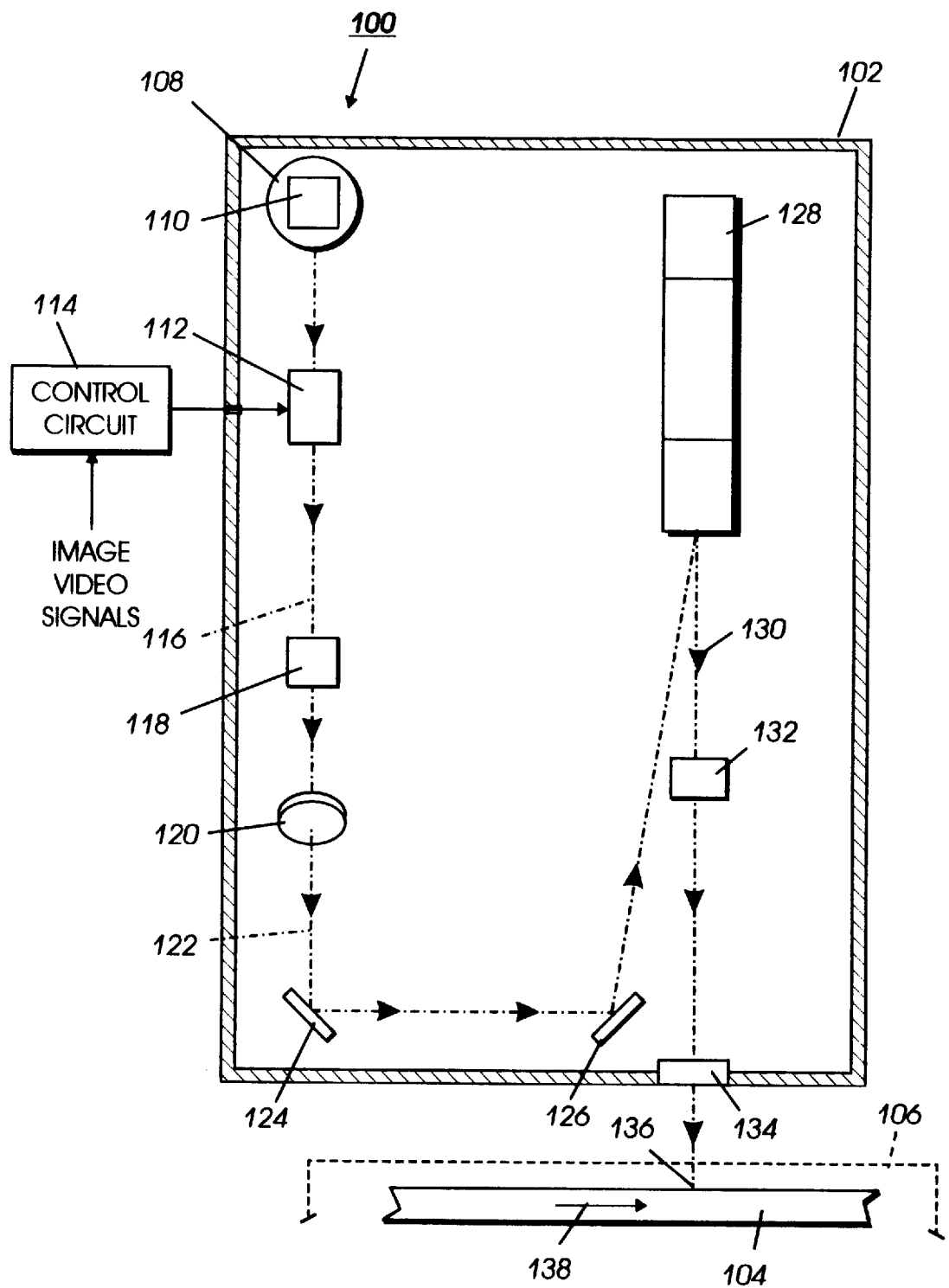
FIG. 2 is an interior sectional view of the ROS housing and the optical components contained therein.

Referring now to FIG. 2, the Raster Output Scanner (ROS) unit 100 consists of a modular housing 102, within which are mounted the optical components which generate the scan lines at the surface of the photoreceptor 104, housed in print module 106. These components Include a laser 108 which generates a collimated beam of monochromatic light. The monochromatic light beam is reflected by first mirror 110 onto modulator 112, the light beam being modulated in conformance with the information contained in the video signal sent from image output control 114. Modulator 114 may be any suitable acousto-optic or electro-optical modulator for recording the video information in form of a modulated light beam, at the output of the modulator (or a modulated laser diode, of course). By means of the modulator, the information within the video signal is represented by the modulated light beam 116. Light beam 116 is reflected by second mirror 118 and is incident on imaging optical system 120. Imaging optical system 120 produces a beam 122, which is reflected by third and fourth mirrors 124 and 126, and impinges upon a plurality of contiguous facets of scanning polygon 128. The beams 130 reflected from polygon 128 are directed through post-polygon conditioning optics 132, and then through output window 134 to form successive, parallel output raster lines 136 at photoreceptor 104, moving in the direction of arrow 138.

Figure 3:
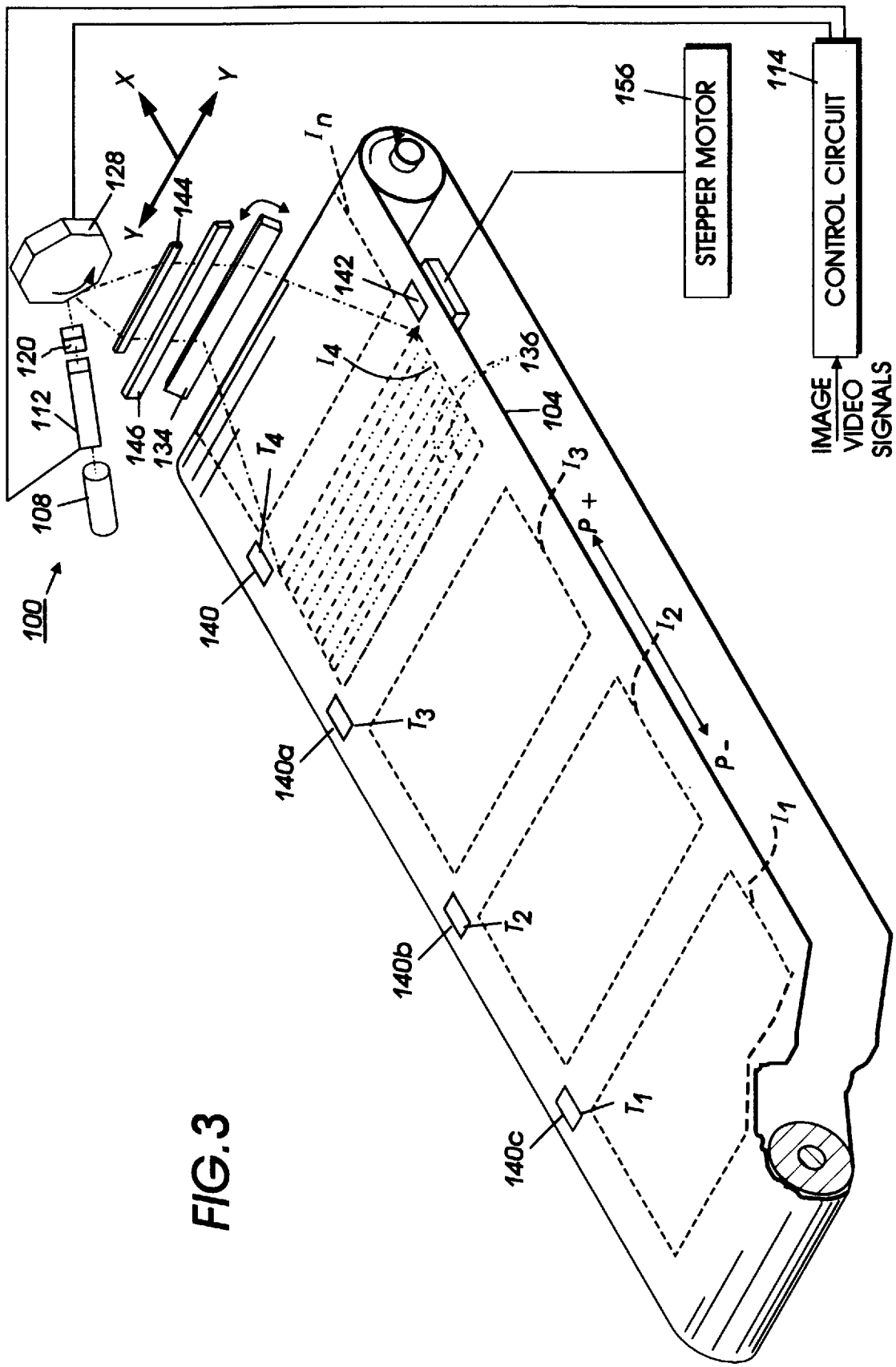
FIG. 3 is a schematic perspective view of a single pass, multiple ROS system adapted to form color images registered in the process direction, in accordance with the present invention.

Referring now to FIG. 3, alignment apertures 140, 142 are formed in the surface of a photoreceptor belt 104, at opposite ends of the belt in the Y or transverse direction, forming an imaginary reference line there between, said reference line defining the lead edge 20d of image $I_4$. As will be seen, there is no requirement for exacting tolerance in the transverse alignment of the two apertures. The apertures in a first embodiment are square shaped, but may be circular or, alternatively, may be replaced by transparent windows formed in the belt surface itself. The apertures are formed to be outside of the image areas, but within the scan length of the ROS.

ROS 100 in FIG. 3, in a simplified view without the folding mirrors and ROS housing of FIG. 2, is a compact system which comprises a gas laser or laser diode 108, which generates a collimated beam of monochromatic light. The light beam is modulated by modulator 112 in accordance with input video image signals processed through control circuit 114. The laser output is directed through a imaging optical system 118 which provides beam expansion of the laser output. The collimated output from system 118 is focused onto facets of rotating polygon 128. The reflected rays from polygon 128 facets are focused in the fast scan direction at the photoreceptor surface 104 forming the scan lines 136. The beam is focused through post-polygon conditioning optics 132 of an fΘ lens 144 to linearize the beam and through cylindrical lens 146, which focuses in the sagittal direction. The beams are directed through output window 134 in a scan line onto the photoreceptor surface. Three other ROS systems (not shown) associated with formation of image areas $I_1$, $I_2$, $I_3$, are similarly constructed.

It is assumed that the ROS system 100 has been initially aligned to correct for any transverse registration errors. Each ROS system will be adjustable for alignment by the following procedure.

Figure 4:
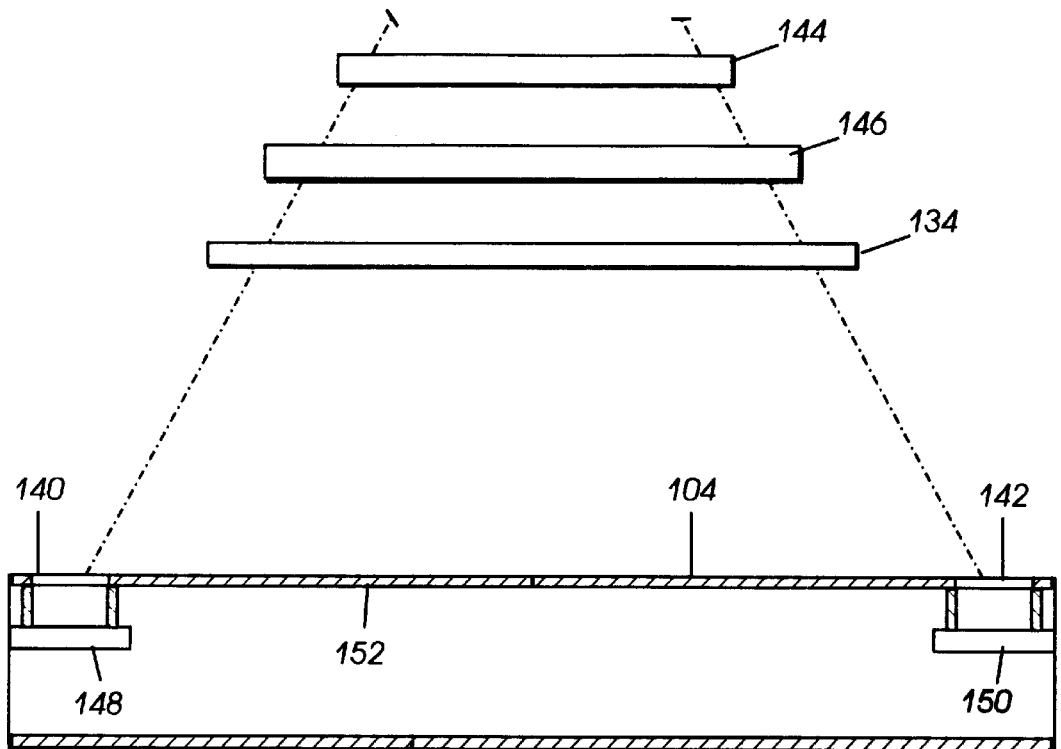
FIG. 4 is a side sectional view of FIG. 3 showing the skew apertures and associated sensors.
Figure 5:
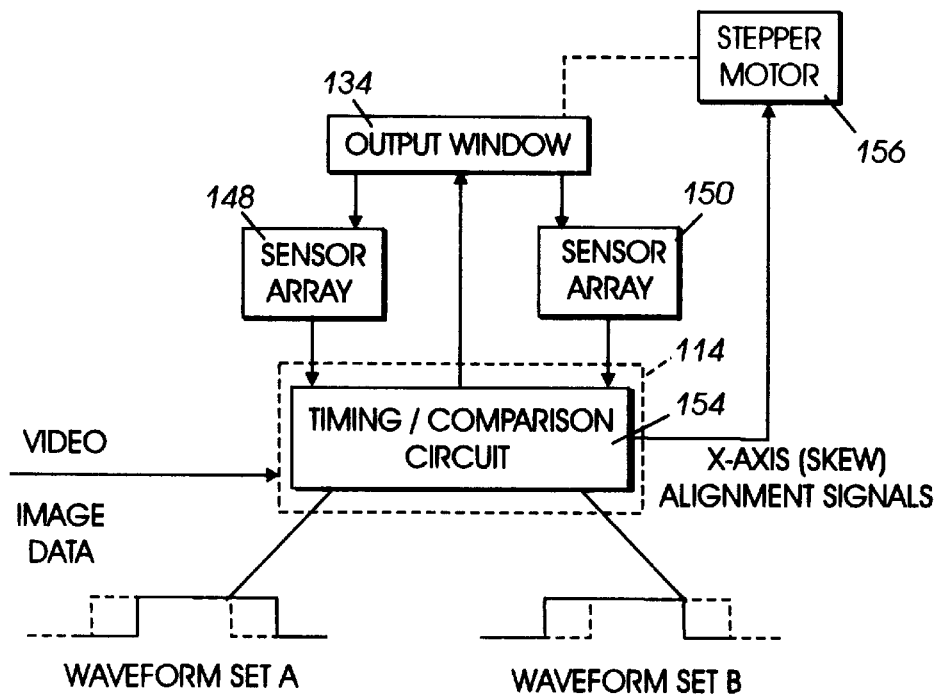
FIG. 5 is a circuit diagram of the skew alignment circuitry.

Photoreceptor belt 104 is moved until apertures 140, 142 are exposed by the scanned beam. As shown in FIG. 4, beneath each aperture, and on opposite sides of the belt, are light sensors 148, 150. The sensor arrays are mounted, for example, to a bar 152, which extends the width of the belt in the transverse direction. Sensor arrays 148, 150 may, for example, be PIN type silicon detectors. As the apertures moving within the belt overly the sensors, light from the ends of the projected scan line are detected by the arrays. Each detected signal for each sensor is sent to a timing comparison circuit 154 (FIG. 5) within control circuit 30. Within this circuit, three situations can be detected.

As shown in waveform set A, if the first signal is detected by array 148 (shown dotted), followed in time by the signal from detector 150, a adjustment signal is required to rotate the scan line in a direction opposite the process direction, (direction $P_+$ in FIG. 3) until the two waveforms are sensed simultaneously. This rotational motion is accomplished by applying signals to an actuator such as stepper motor 156. Stepper motor 156 may have, for example, a 50:1 gear reduction and approximately a 28 thread/inch screw. This provides 1 micron motion/motor step resolution. The stepper motor transmits the correction to the output window of the ROS system to cause the output window to rotate in such a way as to rotate the projected scan line to compensate for the detected error. If waveform set B (FIG. 4) is generated, the rotation error is in the other direction, the output window 135 is rotated in the $P_-$ direction until the two waveforms are coincident. ROS 100, at this point, is precisely aligned in the process direction, to an imaginary reference line formed by the lead edge or by the trail edge of apertures 140, 142.

Figure 6:
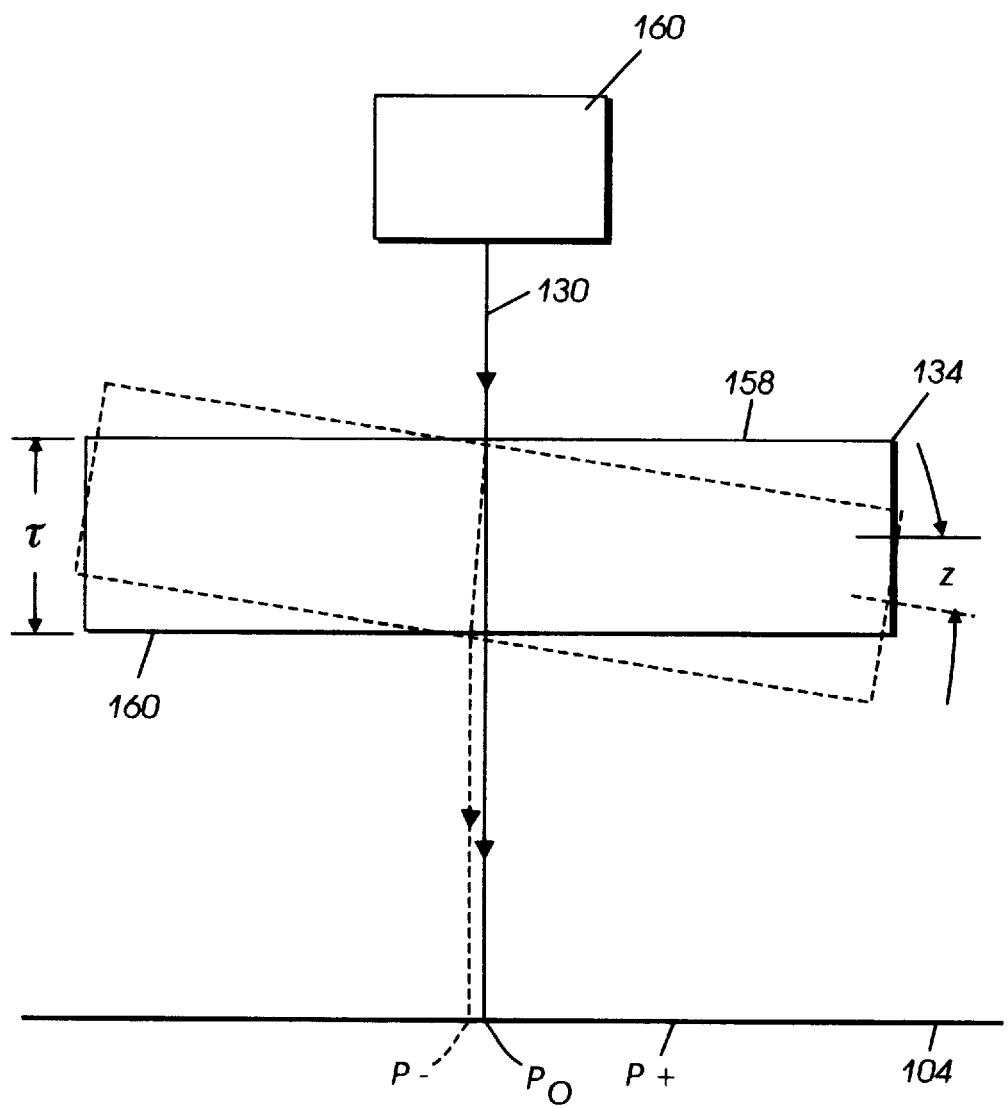
FIG. 6 is a schematic view of the rotatable output window of the ROS housing.

More specifically, as seen in FIG. 6, the output window 134 is formed of an optically transmissive material, such as plastic or glass, with an index of refraction, n. The input surface 158 and output surface 160 of the output window 134 are parallel and, thus, the window has an uniform thickness, t. The output window is in the optical path of the printer system, subsequent to the ROS unit 100 but prior to the photoreceptor 104.

As noted, the stepper motor controllably rotates the output window in such a way as to translate the projected scan line to compensate for the detected error. In the normal, nominal position, the light beam will pass straight through the output window, perpendicular to the input surface 158 and output surface 160 to position $P_0$ on the photoreceptor. Based on the law of refraction applied to each surface of the window, rotating the output window increases the optical path of the light beam through the optical window. Accordingly, the exiting light beam is translated relative to the input light beam 40. The light beam exits parallel to the input beam but offset and the position of the beam on the photoreceptor is altered. The light beam is displaced from the nominal position $P_0$ to position $P_-$ as a result of a controlled angular rotation of the output window by the angle z.

The displacement of the beam can be calculated from equations (1) and (2):

$$d(z)=t \sin (z)[1- \cos (z)/n \cos (z_1)] \qquad \text{Equation 1}$$

where d(z) is the displacement of the beam along the photoreceptor, t is the thickness of the window, n is the index of refraction of the output window and $z_1$ is defined in equation 2.

$$z_1=\sin^{-1}[(n \sin (z))] \qquad \text{Equation 2}$$

The displacement can likewise be made to position $P_+$ by rotating the output window by the angle in the opposite direction.

The above alignment procedure is repeated for each of the remaining ROS systems, advancing the same aperture pair into alignment with the projected scan line formed by each of these systems. Each ROS is then aligned in the same manner, each ROS having an associated sensor array and stepper motor, which rotates the same selected optical component. At the end of the initial alignment, all ROS systems are aligned with respect to the aperture pair, thereby enabling lead edge registration by controlling the registration at the beginning of each image area. In operation, as the lead edge of apertures 140, 140a, 140b, 140c are detected by the associated sensors, a signal will be generated within circuit 114 and a write signal applied by control circuit 114 to each ROS after a finite time interval. The time interval will be the same for all the ROS systems, since the exact position of each scan line is being sensed.

The output window is the last optical component of the ROS. The output window usually does not have optical power. The output window is not in the focal plane of the ROS. The output window is a standard component of the ROS housing and thus is not an additional optical component of the printer system.

This procedure can also work with reflective/transmissive Z mark patterns on the photoreceptor. With reflective marks, the detector is mounted on the same side of the photoreceptor as the ROS unit and positioned accordingly.

In a second embodiment of the invention, one position stepper motor may be eliminated by accepting an initially set position identified for the first ROS system and adjusting the alignment of the remaining ROS systems to conform to this initial aligned position.

Although the invention has been shown in a single pass embodiment, it can also be practiced in a multi-ROS highlight color system where two single ROS imagers; e.g. in FIG. 2, ROS imager 100 being used to form each image.

While the invention has been described with reference to the structures disclosed, it is not confined to the details set forth, but is intended to cover such modifications or changes as they come within the scope of the following claims. For example, while a full color system has been described with four image areas, the invention may be practiced in a highlight color system wherein two exposure areas, black and a second color, are exposed by two ROS systems.

What is claimed is:

1. An imaging system for forming multiple image exposure areas on a photoconductive member during a single pass including:

a photoreceptor belt adapted to accommodate the formation of an integral number of image exposure frames, said belt having a first and second alignment aperture on opposite sides of the belt width and outside of the exposure frame, a plurality of Raster Output Scanners (ROS) units, each ROS unit associated with the formation of one of said image exposure frames, each ROS unit forming a plurality of projected scan lines in a fast scan (traverse) direction across the belt width, said scan lines beginning and ending at points outside of the image exposure frame, first and second detecting means associated with each of said ROS units, said detecting means adapted to sense the projected scan lines when they become visible through said alignment apertures and to generate position signals indicative thereof, and means for rotating a transmissive optical element with no optical power, subsequent to each of said ROS units, to rotate said scan line to correct for process registration errors until detected position signals from said first and second detecting means are concurrent.

2. The imaging system of claim 1 wherein said belt includes additional apertures in the process direction, said additional apertures defining the lead edges of image exposure areas formed by an associated ROS unit and wherein said first detecting means is further adapted to generate edge registration signals during printer operation.

3. The imaging system of claim 1 wherein said transmissive optical element is an output window of each of said ROS units.

4. A method for aligning a plurality of Raster Output Scanning units which form multiple image exposure areas on a photoreceptor belt moving in a process direction, said method comprising the steps of:

(a) providing a first aperture adjacent one edge of the belt outside the image exposure area and a second aperture adjacent the opposite belt edge and outside the image exposure area, (b) moving the photoreceptor belt until the beginning and end of the scan line from a first ROS is sensed by first and second light sensors, (c) comparing the signals sensed by said first and second sensors, (d) rotating a transmissive optical element with no optical power, subsequent to each of said ROS units, to rotate the projected scan line to obtain coincidence of the output signals from said first and second sensors thereby enabling skew adjustment of the projected scan line, and (e) repeating steps b through d for each of the remaining ROS units.

5. The method of claim 4 including the further step of maintaining registration during a printing operation by dynamically comparing signals from the end of the projected scan lines by said first and second sensors as said alignment apertures pass beneath successive projected scan lines.

6. The method of claim 4 wherein the first and second apertures are formed as transparent windows in the photoreceptor.

7. The method of claim 4 wherein said transmissive optical element is an output window of each of said ROS units.

8. A method for compensating for image misregistration in a photoreceptor belt moving in a process direction comprising the steps of:

forming a first and second aperture in the belt, the apertures located in non-image exposure edge areas of the belt, positioning at least a first and second Raster Output Scanner (ROS) in image forming position with respect to the belt, each said ROS forming modulated scan lines on the surface of said belt, moving the belt until said scan line is detected through said apertures by photodetecting means positioned beneath said apertures, and rotating a transmissive optical element with no optical power, subsequent to each of said first and second ROS, to rotate the scan line in a process or reverse process direction until coincidence of output signals from the beginning and end of said scan line is detected by said photodetecting means during dynamic belt motion.

9. Apparatus for process registration of an image area to be exposed on a longitudinally moving belt, said apparatus comprising:

means for defining a pair of targets defining the lead edge of an image area, means for detecting the lateral position of a scan line projected by a ROS in relation to said targets, and means for adjusting the transverse location of the ROS scan lines at the image area so as to compensate for misalignment by rotating a transmissive optical element with no optical power, subsequent to said ROS.

10. Apparatus for multiple image exposures of an image area on a longitudinally moving belt, said apparatus comprising:

modulated laser scanning means for projecting scan lines onto said belt to form an image area, means defining a pair of opposed targets on the belt in a position relative to the image area, means for detecting the lateral positions of said targets for each of the image exposures, and means for adjusting said scanning means for each of the image exposures by rotating a transmissive optical element with no optical power in response to detected positions of said targets to assure process registration of said image exposures.

* * * * *